May 8, 1956  H. L. F. ENLUND  2,744,747
SHOCK ABSORBER
Filed May 1, 1952
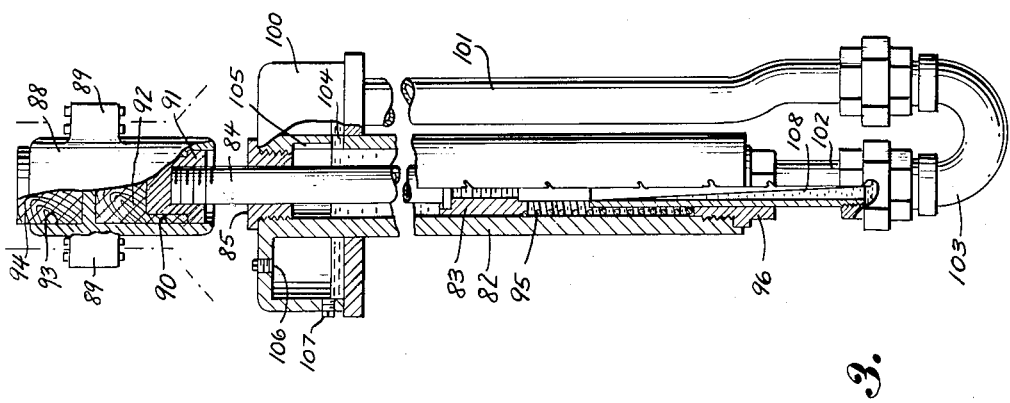
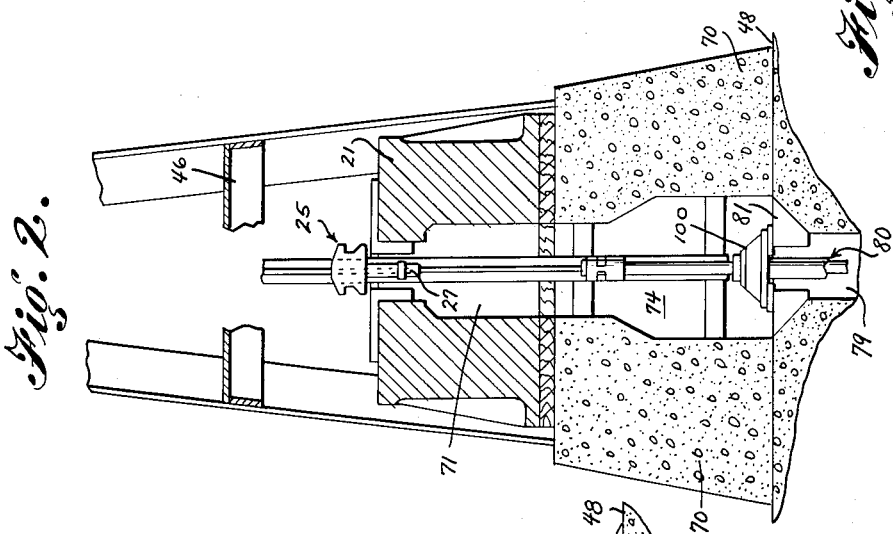
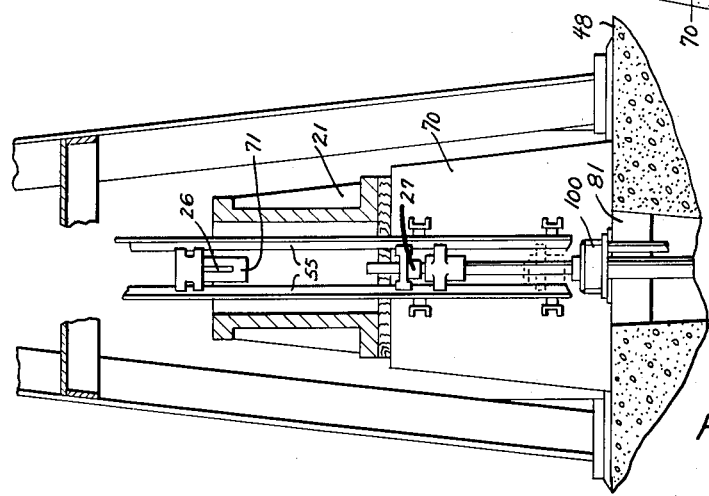
INVENTOR
HELMER L. F. ENLUND
BY George Sipkin
Lee J. Hustyberger ATTORNEYS

United States Patent Office 2,744,747
Patented May 8, 1956

2,744,747

SHOCK ABSORBER

Helmer L. F. Enlund, Oak Ridge, Tenn.

Application May 1, 1952, Serial No. 285,525

3 Claims. (Cl. 267—1)

(Granted under Title 35, U. S. Code (1952), sec. 266)

The invention described herein may be manufactured and used by or for the Government of the United States of America for governmental purposes without the payment of any royalties thereon or therefor.

This invention concerns a shock absorber suitable for use in arresting a body of large mass moving at high velocity.

The shock absorber is found particularly useful with guillotine-type impact testers having a tower in which a mass falls from an elevated position to the bottom of the tower. It is necessary to arrest the mass without damaging parts of the tester. The shock absorber embodies a tapered pin that during the arresting action can move progressively into an orifice to restrict progressively the flow of hydraulic fluid through the orifice.

An object of the invention is to provide a shock absorber.

Another object is to provide a shock absorber suitable for use with an impact tester.

Other objects and many of the attendant advantages of this invention will be readily appreciated as the same becomes better understood by reference to the following detailed description when considered in connection with the accompanying drawings wherein:

Fig. 1 is a view showing the shock absorber associated with an impact tester.

Fig. 2 is a fragmentary elevation taken with parts broken away, illustrating association of the shock absorber with an impact tester.

Fig. 3 is a view partly in section and partly in elevation showing the shock absorber in detail.

In Figs. 1–3 is shown an impact tester in which a cement base 70 sets on a floor 48, which is provided with a cavity 79 disposed in line with the path of travel of the weight 27 through apertures 71 and 74 respectively of anvil 21 and base 70. The cavity 79 contains the shock absorber 80 that operates to brake the fall of the weight 27 and the ruptured piece of the specimen 26 that is attached to it. The shock absorber 80 is supported by the brackets 81 which are seated rigidly in the cavity 79 as shown in Figs. 1 and 2, the shock absorber being held by the brackets in alignment with the falling weight 27 and in position to receive and absorb the impact thereof.

The shock absorber 80 is of the hydraulic type and comprises a cylinder 82 that is disposed in line with the path of travel of the specimen assembly 25 as defined by the guideways 55. A piston or plunger 83 rides in the cylinder 82. Plunger rod 84 is attached to plunger 83 and projects upwardly therefrom through the end of head 85 of the cylinder 82 to a position between the guideways 55 somewhat upwardly of their lower ends. See Figs. 1, 2 and 3.

An abutment head 88 is attached to the end of the plunger rod 84 at its upper end, and comprises the laterally projecting lugs 89 that form oppositely directed slots which engage the respective opposite guideways 55 and hold the abutment head 88 in the path of travel of the weight 27.

The abutment head 88 comprising a downwardly directed socket 90, Fig. 3, that contains the end piece 91 which is attached to the plunger rod 84 at its end. A buffer block 92, of wood or other suitable shock absorbing material, is also contained in the socket 90 interposed between the abutment head 88 and the end piece 91. The abutment head 88 in addition comprises the upwardly directed socket 93 which contains the similar buffer block 94 in position to be struck by the falling weight 27.

The plunger 83 is backed in the cylinder 82 by the compression spring 95, which is enclosed within the cylinder wall and extends from the plunger 83 at its one end to the cylinder end 96 at its other in seating engagement with each. The spring 95 operates to urge the plunger 83 upwardly to project its abutment head 88 to its extended position illustrated in Fig. 2.

A fluid reservoir 100 is attached to the top of the cylinder 82 exteriorly thereof. A riser extends from the cylinder 82 below the plunger 83 to the reservoir 100. The riser comprises the standpipe 101 that enters the reservoir from below, the tube or pipe 102 that projects upwardly into the cylinder 82 for a predetermined distance through its lower end or head 96, and a 180° elbow connecting the pipe 102 with the standpipe 101 at their lower ends. Fluid is able to flow from the reservoir 100 into the cylinder cavity below the plunger 83 through the risers 101, 102, 103 when the plunger 83 moves upwardly in cylinder 82. The passage 104 in the cylinder wall enables fluid to be scavenged out of the cavity in the cylinder 82 above the plunger 83 into the reservoir 100, and the longitudinal slot 105 in the cylinder wall intersects with the passage 104 to prevent fluid from being trapped in the cylinder 82 above the passage 104 when the plunger 83 approaches the top of its stroke. The reservoir 100 is provided with a filling plug 106, and a drain plug 107, the latter serving to determine the level of fluid supply in the reservoir.

The pipe 102 projects upwardly into the cylinder 82 to a predetermined height. The tapered needle 108 is attached to the plunger 83 to project downwardly therefrom into the end of the pipe 102, and in this position the needle 108 constricts the passage that extends from the cavity of cylinder 82 below the plunger 83 through pipe 102, elbow 103 and riser 101 to reservoir 100. When the plunger 83 is in its uppermost position, the passage into the pipe 102 is open to its fullest extent. As the plunger 83 moves downwardly in the cylinder 82, the cross-sectional area of the needle 108 becomes progressively greater proximate to the end of the pipe 102, and the needle 108 thereby operates as a valve that restricts the passage into the pipe 102 in progressively increasing increments.

When a specimen 26 becomes ruptured, the weight 27 with the attached portion of the ruptured specimen 26 continues to fall until it strikes the buffer block 94 of the abutment head 88. The impact drives the plunger 83 downwardly in cylinder 82 against action of the spring 95, to thereby absorb shock of impact of the weight 27.

Downward travel of plunger 83 operates to actuate fluid through the pipe 102, from which the fluid flows through elbow 103 and standpipe 101 into the reservoir 100. Fluid also flows from reservoir 100 through passage 104 into the cavity of cylinder 82 above the plunger 83, which operates in the manner of a pump sucker to draw fluid into the upper end of the cylinder 82. The standpipe 101 provides a fluid head, and the work of moving fluid through the standpipe 101 into the reservoir 100 operates opposed to the plunger 83 to repel its travel in the downward direction. This provides a hydraulic second medium for absorbing shock of the falling weight 27.

The progressively increasing effective area of the needle 108 proximate to the upper end of pipe 102 incident to downward travel of the plunger 83 operates to decrease the area of the fluid passage into the pipe 102 progressively, and thereby serves to regulate the resistance to fluid flow with the downward travel of the plunger 83. Travel of the weight 27 is thereby retarded hydraulically in magnitudes that may be substantially constant, or that may increase progressively with the downward travel of the abutment head 88. The valve of needle 108 operates to regulate resistance to travel of the plunger 83 in increments that may be substantially constant, or that increase progressively as the velocity of the weight 27 is decreased, and therefore as the shock of impact of the weight 27 against the buffer block 94 becomes absorbed and reduced and accordingly less violent.

The distance that the weight 27 is required to travel after rupture of specimen 26 and until it is brought to a stop is greatly reduced by the hereinbefore described shock absorber of the present invention.

When the weight 27 strikes the buffer block 94, and the plunger 83 is thereby driven downwardly, downward travel of the plunger 83 is arrested and it is brought to a stop by the combined action of the several retarding mediums hereinbefore described before the needle 108 has travelled far enough to close the passage into the pipe 102 completely. After the weight 27 travels to its extreme position in a downward direction, it is raised slowly by action of the spring 95 until the weight 27 and the spring 95 are brought into counterbalance.

Obviously many modifications and variations of the present invention are possible in the light of the above teachings. It is therefore to be understood that within the scope of the appended claims the invention may be practiced otherwise than as specifically described.

I claim:

1. A shock absorber comprising an upright cylinder; an upper and a lower cylinder head, each head formed with an axial bore and secured in the upper and lower ends of said cylinder, respectively; a piston reciprocable in said cylinder; a plunger rod secured to said piston and extending through the bore formed in said upper cylinder head; an elongated conical extension secured to and extending from said piston toward the lower end of said cylinder; a compression coil spring in said cylinder and bearing against said piston and said lower cylinder head; a fluid reservoir formed with a bore at its lower end and positioned adjacent the upper end of said cylinder and in fluid communication with the upper end of said cylinder; pipe means for permitting fluid communication between said fluid reservoir and the lower portion of said cylinder, said pipe means at one end thereof extending through the bore of said lower cylinder head into the lower end of said cylinder and sealed to said lower cylinder head and at its other end sealed into the bore formed in the lower end of said fluid reservoir, the end of said pipe means which extends into the lower end of said cylinder registering with the conical extension of said piston whereby it is progressively constricted upon movement of said conical extension into said pipe means; and a quantity of shock absorbing fluid normally occupying a portion of said fluid reservoir and all space in said shock absorber below said fluid reservoir.

2. A shock absorber comprising an upright cylinder; an upper and a lower cylinder head, each head formed with an axial bore and secured in the upper and lower ends of said cylinder, respectively; a piston reciprocable in said cylinder; a plunger rod secured to said piston and extending through the bore formed in said upper cylinder head; an elongated conical extension secured to and extending from said piston toward the lower end of said cylinder; a compression coil spring in said cylinder and bearing against said piston and said lower cylinder head; means forming with the wall of the upper end of said cylinder an annular fluid reservoir coaxial with said cylinder and in fluid communication with the upper end of said cylinder through a small bore formed in the wall of said cylinder adjacent the bottom of said fluid reservoir; large diameter pipe means for permitting fluid communication between said fluid reservoir and the lower portion of said cylinder, one end of said pipe means sealed in the bore of said lower cylinder head and extending part way into the lower end of said cylinder and adapted for registration with said conical extension, the other end of said pipe means sealed in a bore formed in the bottom of said fluid reservoir; whereby the opening in the end of said pipe means which extends into the lower end of said cylinder is progressively constricted upon movement of said conical extension into said pipe means; and a quantity of shock absorbing fluid for occupying a portion of said fluid reservoir and all space in said shock absorber below said fluid reservoir.

3. A shock absorber comprising an upright cylinder; an upper and a lower cylinder head, each head formed with an axial bore and secured in the upper and lower ends of said cylinder, respectively; a piston reciprocable in said cylinder; a plunger rod secured to said piston and extending through the bore formed in said upper cylinder head; an elongated conical extension secured to and extending from said piston toward the lower end of said cylinder; a fluid reservoir formed with a bore at its lower end and positioned adjacent the upper end of said cylinder and in fluid communication with the upper end of said cylinder; pipe means for permitting fluid communication between said fluid reservoir and the lower portion of said cylinder, said pipe means at one end thereof extending through the bore of said lower cylinder head into the lower end of said cylinder and sealed to said lower cylinder head and at its other end sealed into the bore formed in the lower end of said fluid reservoir, the end of said pipe means which extends into the lower end of said cylinder registering with the conical extension of said piston whereby it is progressively constricted upon movement of said conical extension into said pipe means; and a quantity of shock absorbing fluid normally occupying a portion of said fluid reservoir and all space in said shock absorber below said fluid reservoir.

References Cited in the file of this patent

UNITED STATES PATENTS

| 1,752,072 | Foster | Mar. 25, 1930 |
| 1,772,387 | Dickerson | Aug. 5, 1930 |
| 1,780,531 | Messier | Nov. 4, 1930 |
| 2,038,032 | Flynn | Apr. 21, 1936 |
| 2,069,791 | Wallace | Feb. 9, 1937 |

FOREIGN PATENTS

| 121,688 | Switzerland | Oct. 1, 1927 |
| 262,460 | Switzerland | Oct. 1, 1949 |
| 126,831 | Sweden | Dec. 6, 1949 |
| 720,302 | Germany | June 4, 1942 |